United States Patent
Tybuszynski

(10) Patent No.: US 12,193,372 B2
(45) Date of Patent: Jan. 14, 2025

(54) ADJUSTABLE LAWN EDGING ATTACHMENT FOR TRIMMING AROUND SPRINKLER HEADS

(71) Applicant: Edward Tybuszynski, Tequesta, FL (US)

(72) Inventor: Edward Tybuszynski, Tequesta, FL (US)

(*) Notice: Subject to any disclaimer, the term of this patent is extended or adjusted under 35 U.S.C. 154(b) by 0 days.

(21) Appl. No.: 18/399,593

(22) Filed: Dec. 28, 2023

(65) Prior Publication Data

US 2024/0122102 A1    Apr. 18, 2024

Related U.S. Application Data

(63) Continuation-in-part of application No. 17/175,608, filed on Feb. 12, 2021, now Pat. No. 11,968,934.

(60) Provisional application No. 63/477,430, filed on Dec. 28, 2022, provisional application No. 62/976,345, filed on Feb. 13, 2020.

(51) Int. Cl.
  *A01G 3/06* (2006.01)
  *A01D 34/68* (2006.01)
  *A01D 34/84* (2006.01)

(52) U.S. Cl.
  CPC .......... *A01G 3/06* (2013.01); *A01D 34/68* (2013.01); *A01D 34/84* (2013.01)

(58) Field of Classification Search
  CPC . A01G 3/06; A01G 3/062; A01G 3/00; A01G 3/067; A01D 34/84; A01D 34/68; A01D 34/863; A01D 34/001; A01D 34/00; A01D 34/416; A01D 34/733
  See application file for complete search history.

(56) References Cited

U.S. PATENT DOCUMENTS

| | | | |
|---|---|---|---|
| 5,036,654 A * | 8/1991 | Malutich | A01D 34/733 56/255 |
| 5,493,783 A * | 2/1996 | Oostendorp | A01D 34/84 30/287 |
| 6,163,964 A * | 12/2000 | Calcinai | A01D 34/4161 30/276 |

(Continued)

FOREIGN PATENT DOCUMENTS

| | | | | |
|---|---|---|---|---|
| CN | 104067767 B * | 5/2018 | | A01D 34/64 |
| WO | WO-2010040022 A2 * | 4/2010 | | A01D 34/4168 |

*Primary Examiner* — Adam J Behrens
*Assistant Examiner* — Blake E Scoville
(74) *Attorney, Agent, or Firm* — Allen F. Bennett; Bennett Intellectual Property

(57) ABSTRACT

A lawn trimmer attachment for trimming sprinkler heads has downwardly extending cutting blades which may be inserted into the blade sockets to adjust the distance between the blades. An adjustable lawn edging attachment for trimming around sprinkler heads comprises a body, an adapter extending upward from the body, two or more elongated arms extending outward from the periphery of the body, two or more blade sockets along a longitudinal direction on a bottom side of each of the two or more elongated arms, and a blade extending downward from the bottom of each of the two or more elongated arms. The adjustable lawn edging attachment further comprises a spring biased interlock pin on the distal end, where the spring biased interlock pin extends through the blade base to lock the blade into one of the two or more blade sockets on each of the two or more elongated arms.

7 Claims, 14 Drawing Sheets

(56) References Cited

U.S. PATENT DOCUMENTS

| | | | | |
|---|---|---|---|---|
| 6,311,782 | B1* | 11/2001 | Plasek | A01G 3/06 |
| | | | | 30/DIG. 7 |
| 6,857,480 | B2* | 2/2005 | Thompson, Sr. | A01B 1/24 |
| | | | | 172/13 |
| 8,069,758 | B2* | 12/2011 | Zhang | A01D 34/733 |
| | | | | 83/13 |
| 8,201,639 | B2* | 6/2012 | Szurpicki | A01B 1/00 |
| | | | | 172/380 |
| 10,448,566 | B2* | 10/2019 | Morabit | A01D 34/4165 |
| 11,968,934 | B2* | 4/2024 | Tybuszynski | A01D 34/84 |
| 2010/0083506 | A1* | 4/2010 | Bennett | A01D 34/4168 |
| | | | | 30/122 |

* cited by examiner

ADJUSTABLE LAWN EDGING ATTACHMENT FOR TRIMMING AROUND SPRINKLER HEADS

CROSS-REFERENCE TO RELATED APPLICATIONS

This application claims priority to U.S. Provisional Applications Ser. No. 63/477,430 filed on Dec. 28, 2022 and 63/976,345 filed on Feb. 13, 2020, and is a continuation in part of U.S. Utility application Ser. No. 17/175,608 filed on Feb. 12, 2021.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of the Invention

The present invention relates to a lawn edger having a head for trimming a lawn in a circular pattern. More particularly, the invention relates to a removable lawn edger head having an adjustable annular cutting edge.

Description of the Related Art

Trimming and edging around lawn sprinkler heads is typically a time-consuming and tedious task. Grass surrounding a sprinkler head may grow over the sprinkler head and impede operation. Frequent edging is required to provide a landscaped appearance and to permit sprinklers to operate properly.

Landscapers conventionally perform such edging either manually using conventional motorized grass trimming devices. Manual edging is extremely tedious, inefficient and impractical when a large number of sprinkler heads are involved, such as on a golf course. A golf course may have 800 to 1000 sprinkler heads. Concomitantly, golf courses place a premium on aesthetics and carefully manicured greens. Manual cutting is not conducive to a uniform, precise, repeatable and aesthetically pleasing cut.

While more efficient than scissors, conventional motorized trimmers that use a spinning cord are not conducive to a uniform, precise and aesthetically pleasing cut. Often they result in a noticeably uneven cut due to bouncing of the cutting device off the surface of the ground. Additionally, such trimmers must be manipulated around the entire periphery of the sprinkler head, still making the job quite tedious. Furthermore, the cutting cords of such trimmers frequently break, especially after repeated contact with sprinkler heads, incurring additional time and cost for replacement. Moreover, such devices have a tendency to damage yardage markers commonly placed on sprinkler heads in golf courses and mar the contacted surfaces of the sprinkler heads.

While motorized rotary cutters have been developed for edging around sprinkler heads, these devices typically have a poor and unbalanced construction that does not adequately protect the sprinkler head. Though quicker and more efficient than scissors and conventional motorized trimmers, such devices still suffer many shortcomings. They tend to break easily, bounce upon contacting the sprinkler head, produce an off-centered non-uniform cut, damage yardage markers on sprinkler heads and mar the contacted surfaces of the sprinkler heads.

Furthermore, other sprinkler trimming attachments do not allow the user to easily change the diameter of their cuts to account for larger or smaller sprinkler heads. This leads to an increase in time and frustration from the user since they may need to switch out the attachments multiple times while cutting their lawn.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide a device to produce a centered, uniform, repeatable cut for edging around sprinkler heads, without marring or damaging the sprinkler heads or yardage markers on them.

BRIEF SUMMARY OF THE INVENTION

Disclosed is an annular lawn edger having an elongate pole housing a motor, a handle including a grip, a removable battery, and a trigger for actuating the motor. The lawn edger of the invention includes adapter at a distal end of the pole configured to impart rotational motion to a lawn edging head attached to the adapter. The lawn edging head has the general form of a hole saw. The hole saw edging head has a body formed from a cylinder having an attachment disk at a proximal end, an annular cutting edge along the distal end of the cylinder. An attachment mechanism removably attaches the edging head to the adapter The edging head attachment mechanism is attached to the adapter by pressing it in a proximal direction against the adapter in the attachment mechanism is released from the adapter by the pressing a button on the adapter.

Also disclosed is an adjustable lawn trimming attachment for trimming around sprinkler heads comprising a body, an adapter extending upward from the body, two or more elongated arms extending outward and are substantially coplanar to the body, two or more blade sockets along a longitudinal direction on the bottom side of each of the two or more elongated arms, and a blade extending downward from the bottom of each of the two or more elongated arms. The adjustable lawn trimming attachment further comprises a spring biased interlock pin on the distal end of each of the two or more arms, where the spring biased interlock pin extends through the blade base to lock the blade into one of the two or more blade sockets on each of the two or more elongated arms.

In one embodiment, the adjustable lawn trimmer includes three elongated arms that extend outward from the body and are substantially coplanar to the body. Each of the three elongated arms include four blade sockets along a longitudinal direction on a bottom side of each of the two or more elongated arms, and a blade extending downward from the bottom of each of the three elongated arms.

It is therefore an object of the present invention to provide an adjustable attachment for a lawn edger that produces a centered, uniform, repeatable cut for edging around sprinkler heads of varying diameters. No more getting on your hands and knees to pull out grass from your sprinkler heads.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
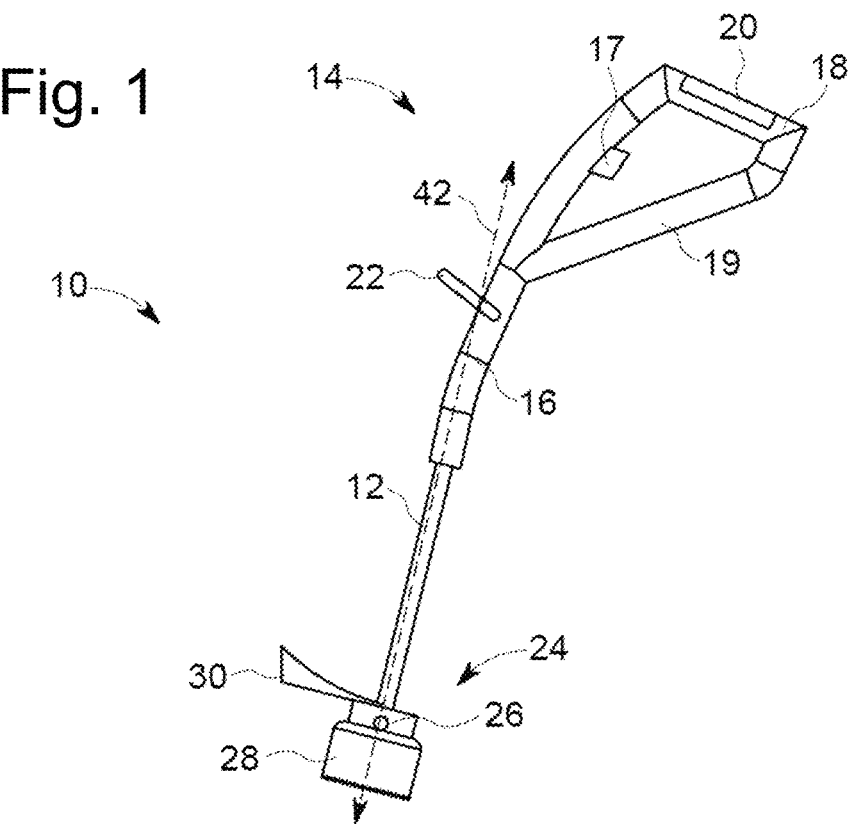
FIG. 1 is a side view of an annular lawn edger in accordance with the principles of the invention.
Figure 2:
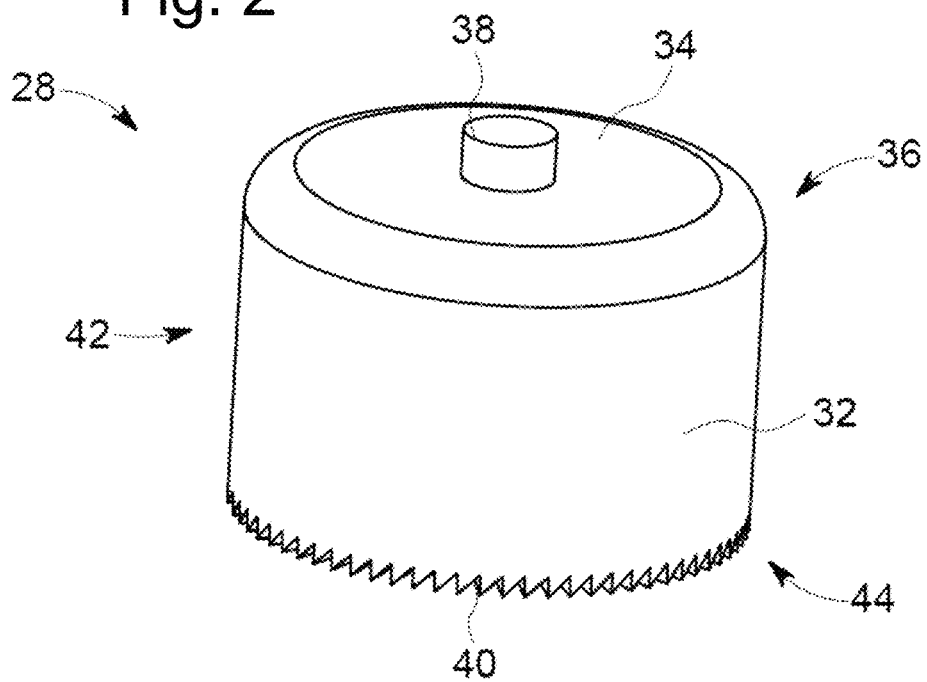
FIG. 2 is a perspective view of an annular lawn edger head in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein. Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Unless otherwise indicated, all numbers expressing quantities of ingredients, dimensions, reaction conditions and so forth used in the specification and claims are to be understood as being modified in all instances by the term "about". The term "a" or "an" as used herein means "at least one" unless specified otherwise. In this specification and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise. Furthermore, "proximal" generally refers to the direction toward the operator of the device and "distal" generally refers to the direction away from the operator of the device.

In describing the lawn trimmer attachment for trimming sprinkler heads, the term "longitudinal" is used to describe the length of the elongate body, and "transverse" refers to a direction perpendicular to the longitudinal direction of the elongate body. "Top" and "upward" refer to side of the attachment that attaches to a lawn trimmer's rotating head. "Bottom" and "downward" refer to the direction opposite to the "top." "Lateral" generally refers to the sides parallel to the longitudinal direction and "distal" refers to the ends of the longitudinal length of the elongate body.

Various embodiments of the disclosure could also include permutations of the various elements recited in the claims as if each dependent claim was a multiple dependent claim incorporating the limitations of each of the preceding dependent claims as well as the independent claims. That is, the combinations of the various components of the invention are not limited to those combinations expressly shown in the Figures. Unless expressly stated otherwise, components described in one embodiment may be interchanged with components of the same name found in other embodiments. Such permutations are expressly within the scope of this disclosure.

Figure 3:
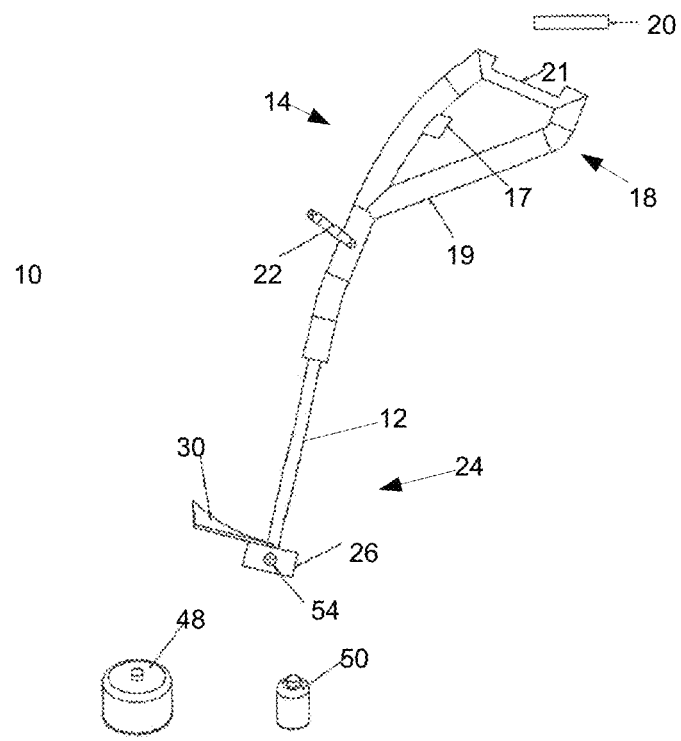
FIG. 3 is another side view of an annular lawn edger in accordance with the principles of the invention.
Figure 4:
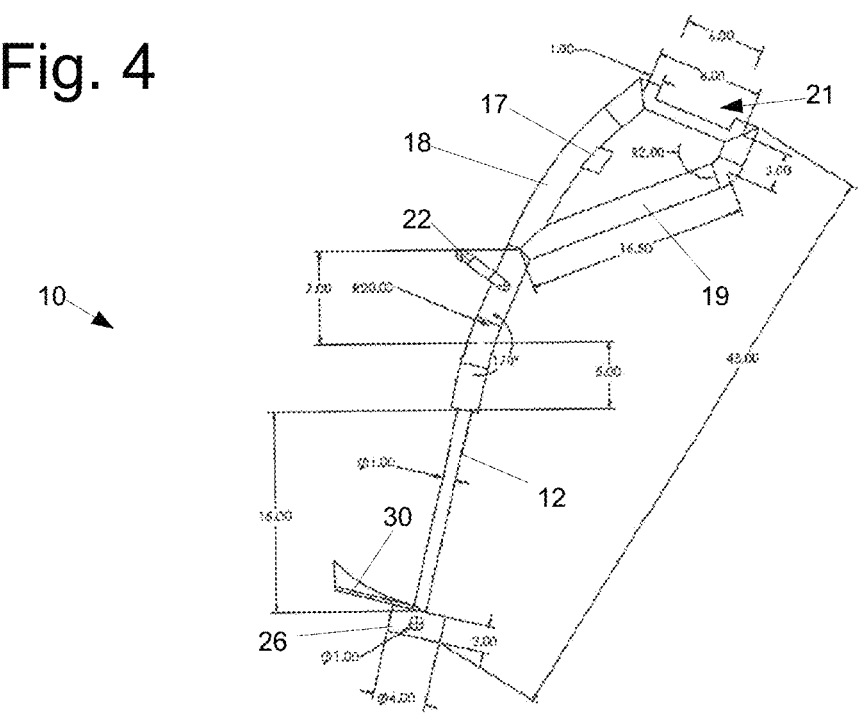
FIG. 4 is another side view of an annular lawn edger showing exemplary dimensions in accordance with the principles of the invention.
Figure 5:
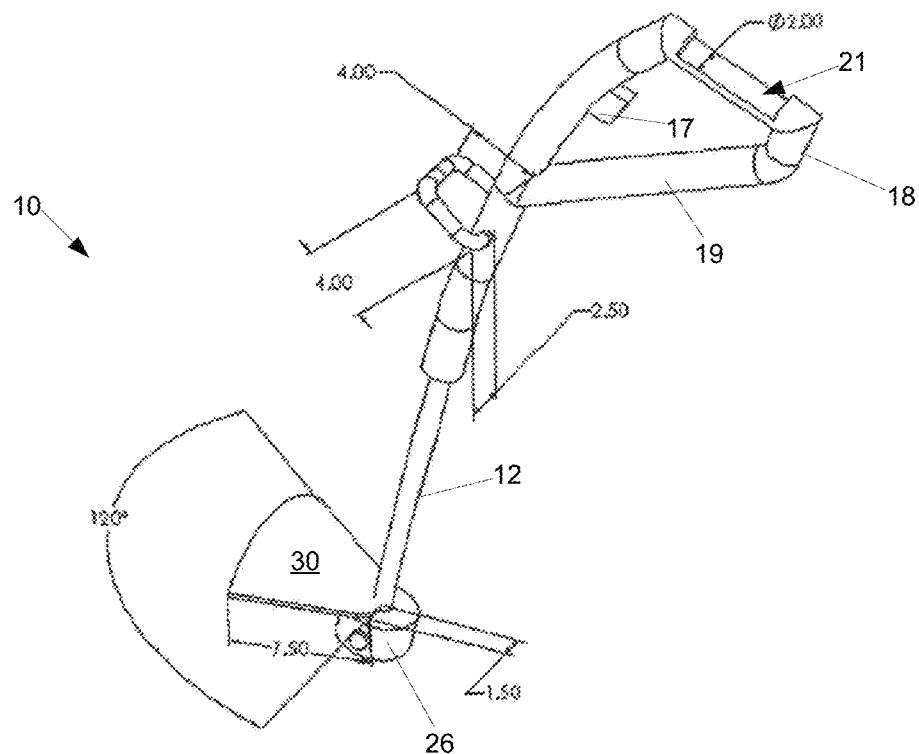
FIG. 5 is a perspective view of an annular lawn edger showing exemplary dimensions in accordance with the principles of the invention.

FIGS. 1-6 show an annular lawn edger 10 in accordance with principles of the invention. The annular lawn edger 10 includes an elongate pole 12 housing an internal electric motor, not shown. The proximal end 14 of the pole 12 has a handle 16 including a grip 18 which houses a rechargeable battery 20. Batter 20 is optionally removable from a slot 21 and a trigger 17. FIGS. 3-5 show the handle 16 with the battery removed from battery slot 21. In this embodiment, the handle 16 includes a diagonal strut 19 lending support to the handle 16 and pole 12 and minimizing wobbling of the device during use. The handle 16 also includes an ancillary handle 22 so that the annular lawn edger 10 may be held by both hands of an operator, providing greater control over the device. At the distal end 24 of the edger 10 is an adapter 26 configured to removably attach an annular lawn edging head 28. The adapter 26 imparts rotational motion to the edging head 28, or any other edging head, attached to it. A grass guard 30 extends around at least a portion of the adapter 26.

The adapter 26 is in general configured to attach to a spool of lawn edger wire. The annular lawn edger 10 in accordance with the principles of the invention has an edging head 28 secured to the adapter 26. The annular lawn saw edging head 28 is shown in more detail in FIG. 2. The annular lawn edging head 28 has the general configuration of a hole saw, having a body 42 formed from a proximal disk 34 and a cylinder 32 extending in a distal direction from the disk 34. The proximal disk 34 extends over the proximal end 36 of the cylinder 32 and has an attachment mechanism 38 in its center configured to removably attached to the adapter 26. A cutting edge 40 extends along the annular distal end 44 of the cylinder 32. The lawn edging head 28 is made of a hard resin and/or plastic, such as for example high density polyethylene, high density polypropylene, polystyrene resin, polyurethane resin, epoxy resin, silicone resin, acrylic resin and/or polyester resin and the like.

In use, the attachment mechanism 38 is snapped into the adapter 26 by pressing it in a proximal direction. Once attached, the annular lawn edging head 28 rotates about an axis 42 defined by the pole 12 and extending through the center 44 of the cylinder 32. The annular lawn edger 10 is placed over a sprinkler or other circular object. The trigger is then depressed, actuating the motor which imparts torque to the annular lawn edging head. The annular lawn edging head rapidly and efficiently cuts a circular hole in vegetation surrounding the lawn sprinkler head. The annular lawn edger 10 may be used to cut a circular opening in vegetation about any other desired object as well. Optionally, an annular lawn edger 10 may be provided with a plurality of annular lawn edging heads having cutting edges of different diameters, allowing the device to accommodate different sprinkler head sizes.

Figure 6:
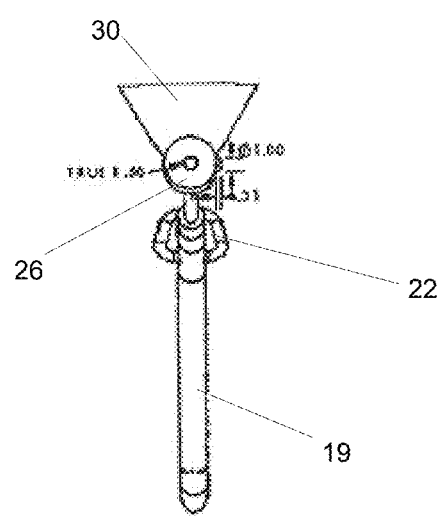
FIG. 6 is a bottom view of an annular lawn edger showing exemplary dimensions in accordance with the principles of the invention.

FIG. 3 shows the annular lawn edger 10 having to separate hole saw edging heads 48 and 50 having diameters of 8.5 inches and 2.5 inches, respectively. As shown in FIGS. 3 and 4, the adapter 26 preferably includes a spring biased quick release button 54. When an edging head is snapped into the adapter, it is held in place by a spring biased locking tab. The release button 54 is biased by the same spring as the locking tab, and when depressed pushes the locking out of place to allow the edging head to be removed. Optionally, the adapter may include a spring bias applied to the attachment mechanism of the head such that when the quick release button 54 is depressed, the edging head is pushed out of the adapter. FIGS. 4-6 show exemplary dimensions of an annular lawn edger in accordance with the principles of the invention.

Figure 7:
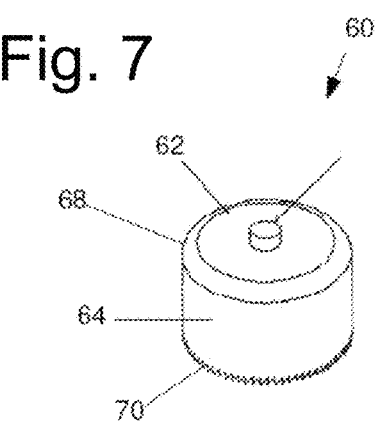
FIG. 7 is a perspective and bottom view of an annular lawn edger head in accordance with the principles of the invention.
Figure 8:
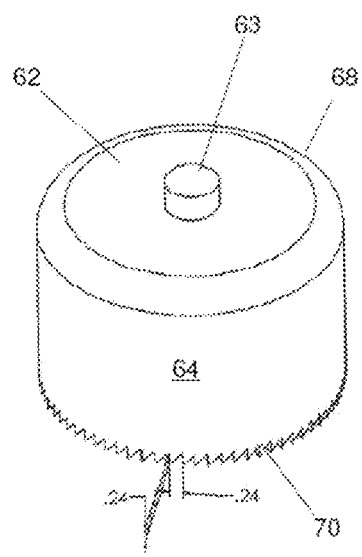
FIG. 8 is a perspective and bottom view of an annular lawn edger head in accordance with the principles of the invention.
Figure 9:
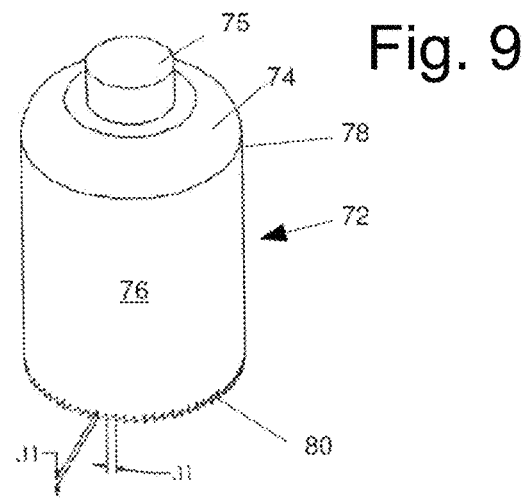
FIG. 9 is a perspective and bottom view of an annular lawn edger head in accordance with the principles of the invention.
Figure 10:
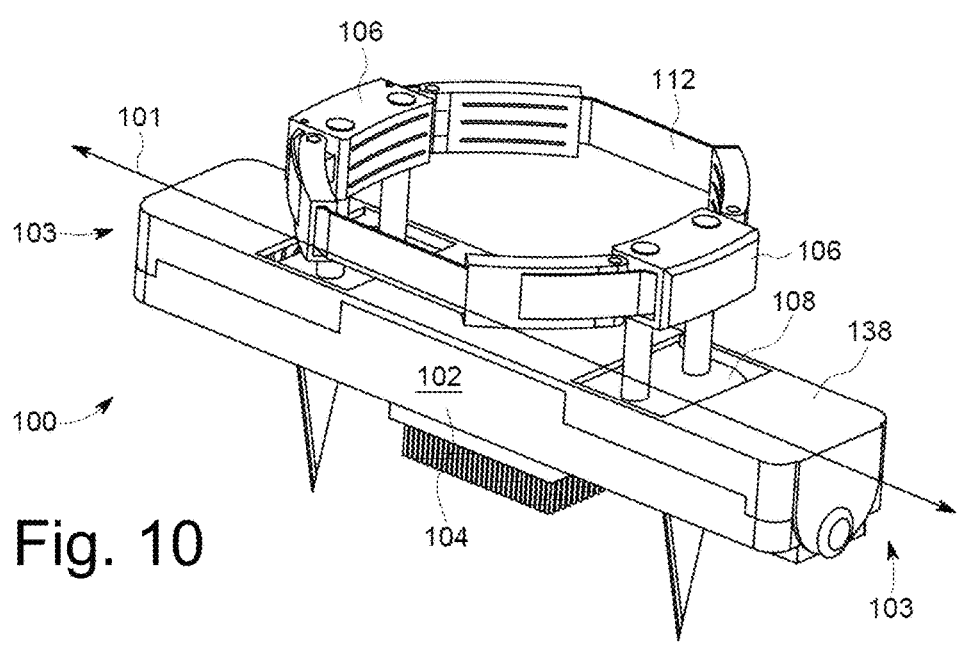
FIG. 10 is a top perspective view of a lawn trimmer attachment for trimming sprinkler heads in accordance with principles of the invention.
Figure 11:
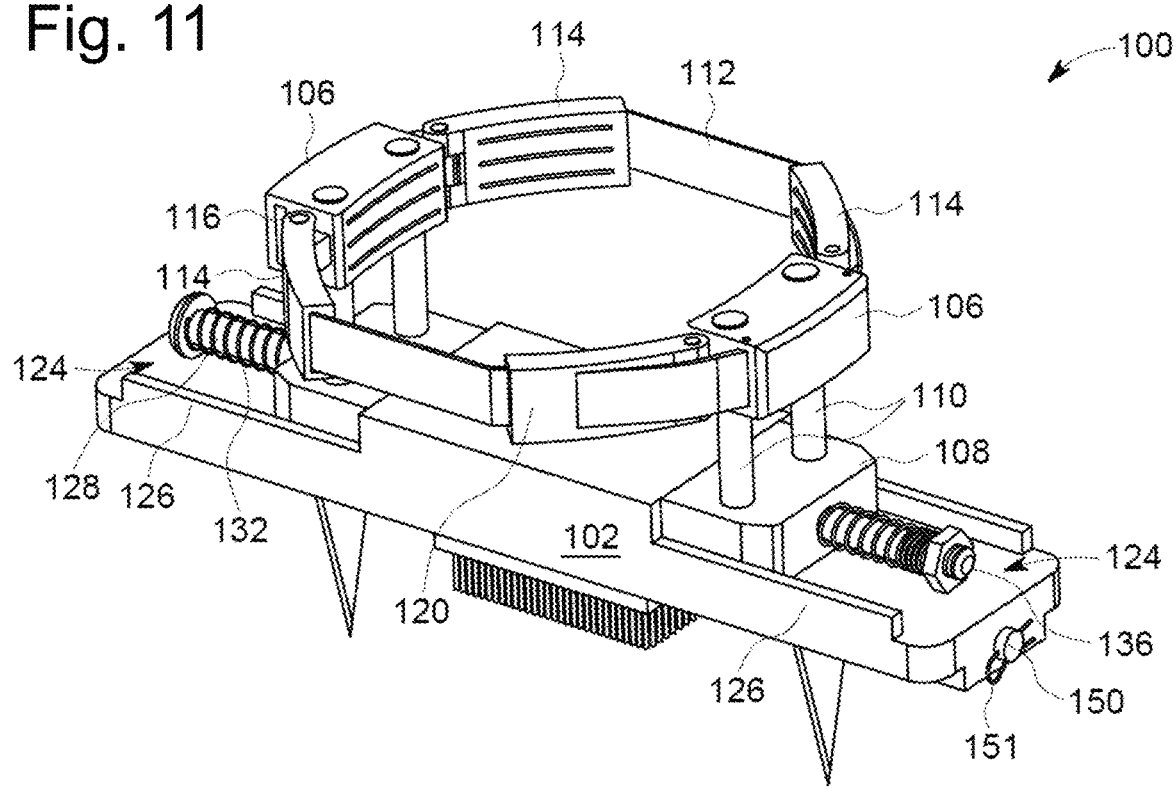
FIG. 11 is another top perspective view of a lawn trimmer attachment for trimming sprinkler heads in accordance with principles of the invention.
Figure 12:
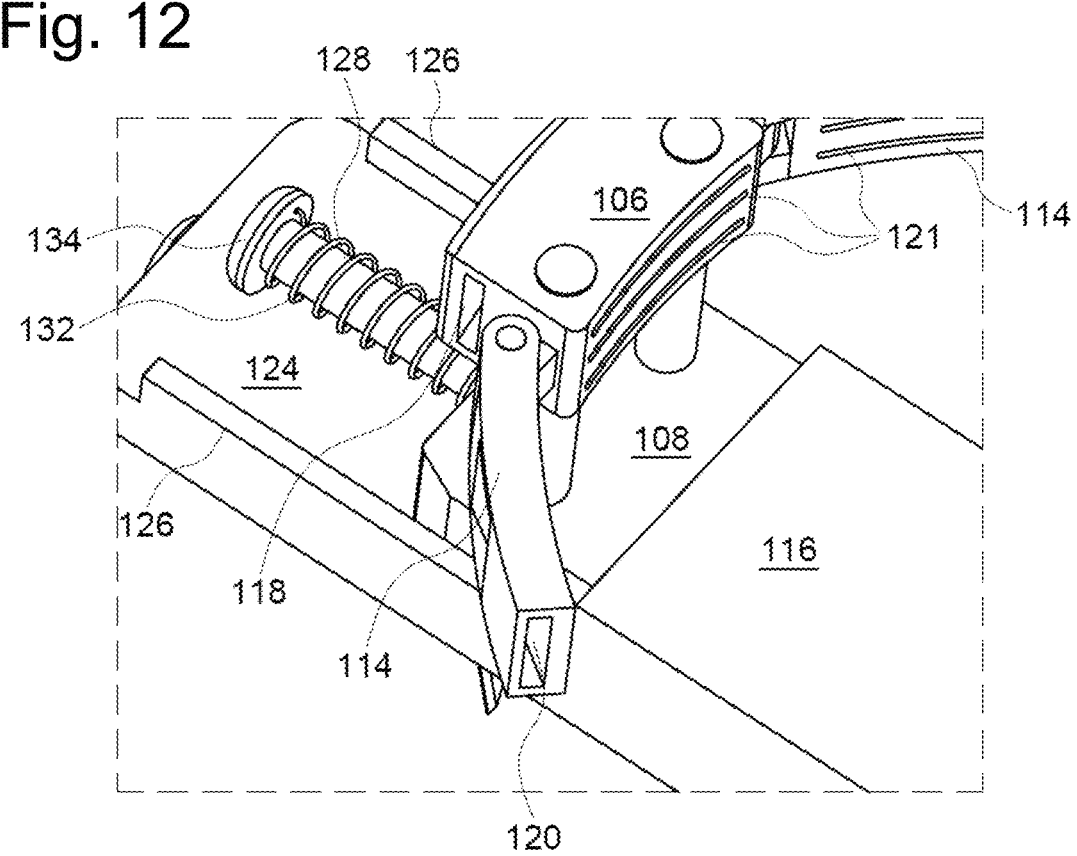
FIG. 12 is an enlarged top perspective view of a lawn trimmer attachment for trimming sprinkler heads in accordance with principles of the invention.
Figure 13:
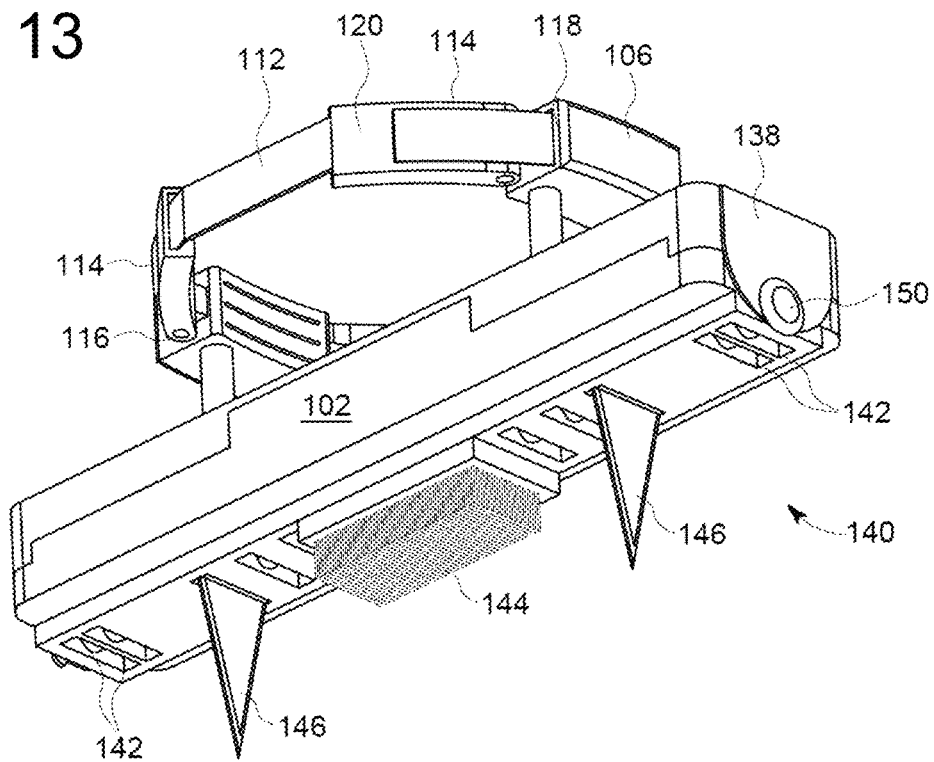
FIG. 13 is a bottom perspective view of a lawn trimmer attachment for trimming sprinkler heads in accordance with principles of the invention.
Figure 14:
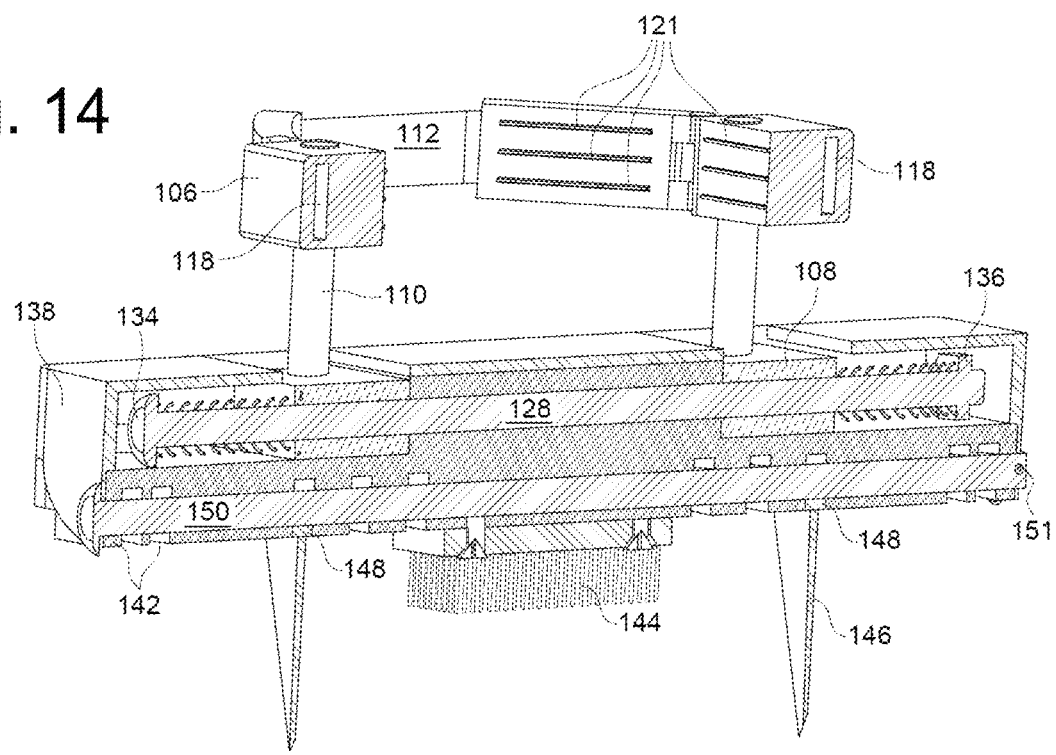
FIG. 14 is a cross-sectional view of a lawn trimmer attachment for trimming sprinkler heads in accordance with principles of the invention.
Figure 15:
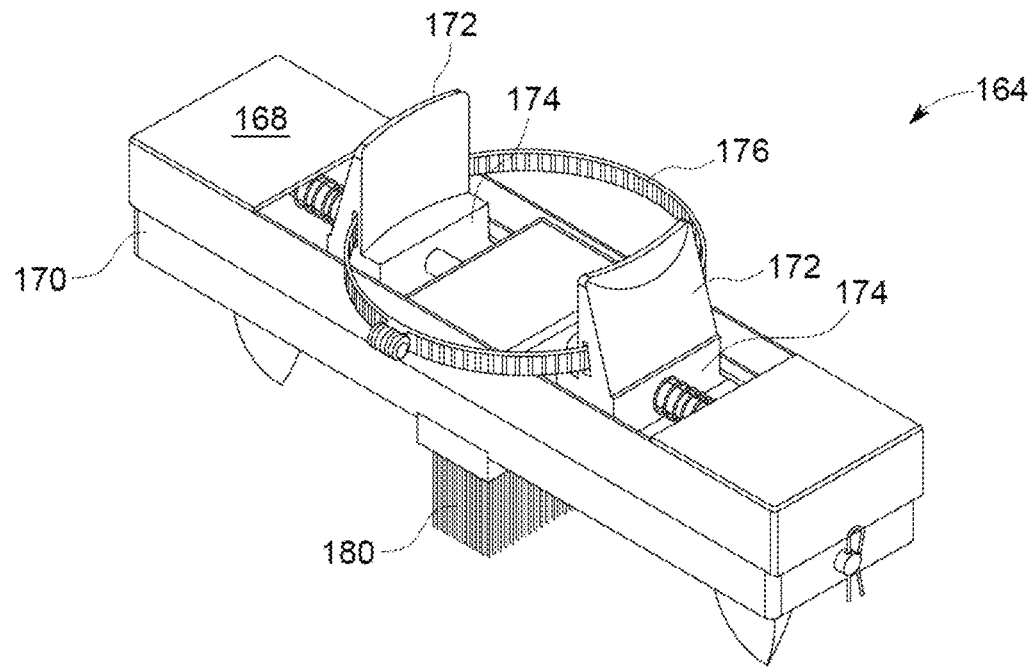
FIG. 15 is a top perspective view of an alternative embodiment of a lawn trimmer attachment for trimming sprinkler heads in accordance with principles of the invention.
Figure 16:
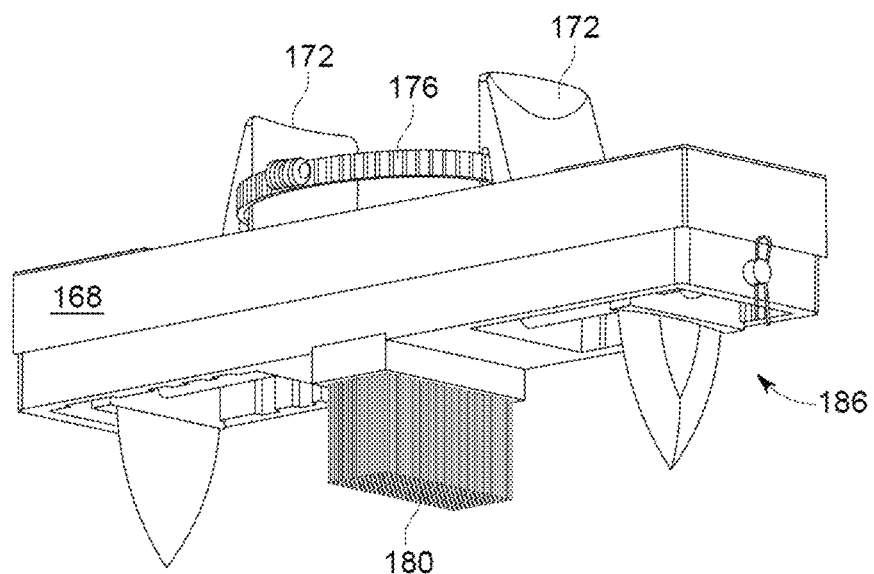
FIG. 16 is a side perspective view of an alternative embodiment of a lawn trimmer attachment for trimming sprinkler heads in accordance with principles of the invention.
Figure 17:
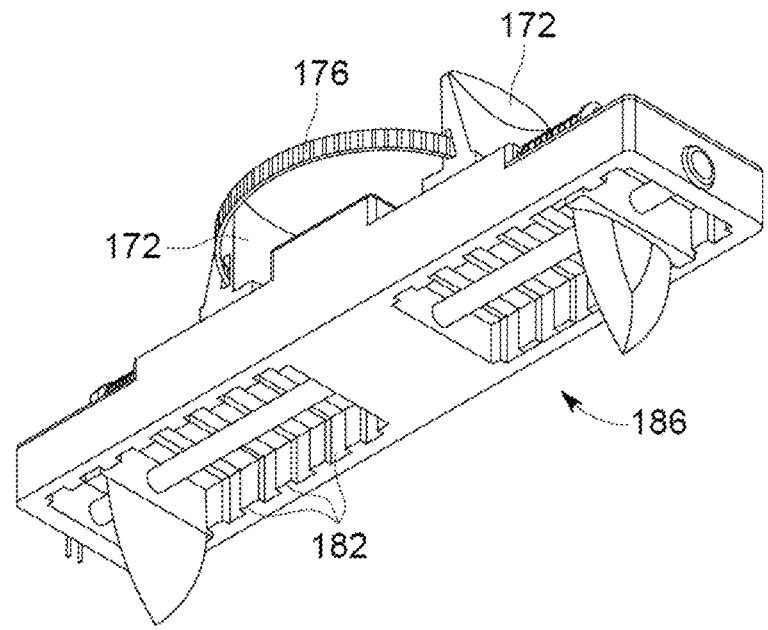
FIG. 17 is a bottom perspective view of an alternative embodiment of a lawn trimmer attachment for trimming sprinkler heads in accordance with principles of the invention.
Figure 18:
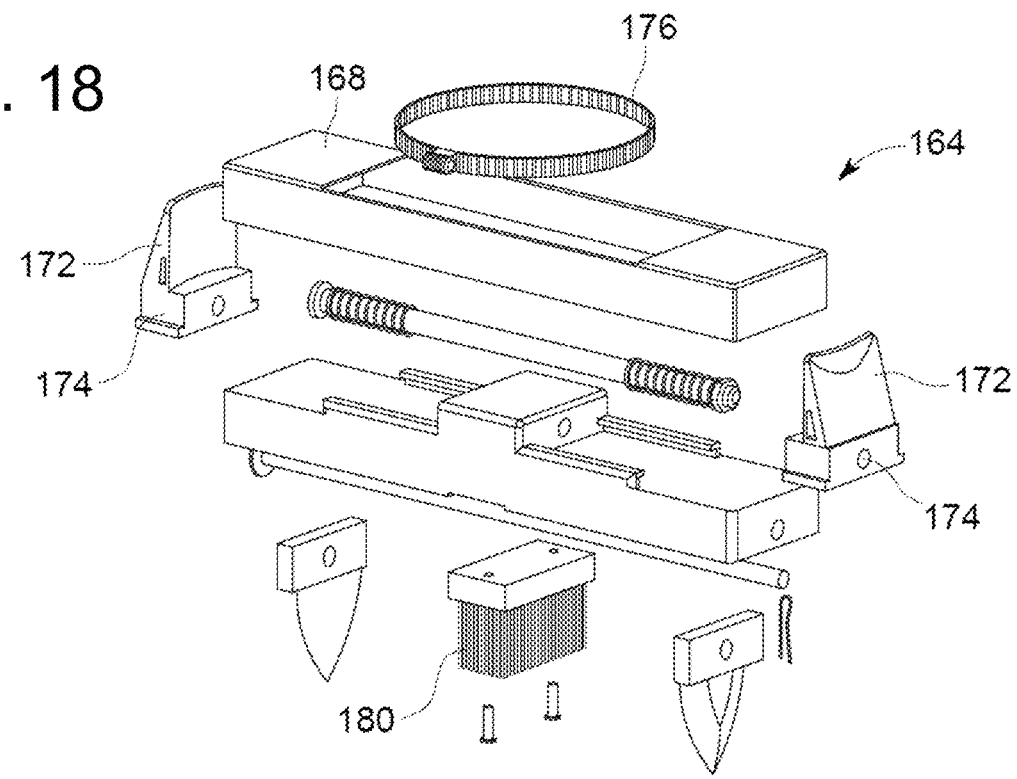
FIG. 18 is an exploded perspective view of an alternative embodiment of a lawn trimmer attachment for trimming sprinkler heads in accordance with principles of the invention.

FIGS. 7-9 show exemplary dimensions for two annular lawn edging heads of different size in accordance with the principles of the invention. Annular lawn edging head 60 has a proximal disk 62 and an attachment mechanism 63 at its center. a cylindrical body 64 extending in a distal direction from the edge 68 of the disk 62. The distal end of the annular lawn edging head 60 has a cutting edge 70. Annular lawn edging head 72 has a hemispherical top 74 with an attachment mechanism 75 at its center. The cylindrical body 76 extends in a distal direction from the edge 78 of the hemispherical top 74. The distal end of the annular lawn edging head 72 has a cutting edge 80. A hemispherical top 74 distributes stress on the head more evenly, thus preventing vertical flexion, which may be encountered when the proximal end of the annular lawn edging head is a planar disk. A hemispherical top may also prevent wobbling of the annular lawn edging head. Optionally, the hemispherical top may be constructed of fairly flexible material. This allows a user to tilt the edging head in order to cut deeper and/or with more force on a particular point around the circular object being trimmed. Annular lawn edging heads 60

In one embodiment, the adapter is a socket designed to house a spool of cutting cord and has an end cap covering the spool. The attachment mechanism is configured to attach to the socket when the end cap and cutting cord spool are removed. This allows the annular lawn edger of the invention to be used with almost any existing motorized trimmer.

In an alternative embodiment, the attachment mechanism is cylindrical and includes a tapered flange at its top. The flange may be continuous or comprised of a plurality of discrete teeth. The angled upper surface of the flange allows the annular lawn edging head to snap past one or more spring biased tabs and into a socket. The spring biased tabs impinge on the lower portion of the attachment mechanism. To release the annular lawn edger, a button on the exterior of the adapter is depressed. When the button is depressed, the tabs are retracted, allowing the flange to pass over them.

FIGS. 10-14 show another alternative embodiment of a lawn trimmer attachment for trimming sprinkler heads 100 in accordance with principles of the invention. The attachment 100 is configured to be fit over an existing rotating flexible line weed eater head. The lawn trimmer attachment 100 has an elongate body 102 extending along a longitudinal direction 101 between two distal ends 103. In this embodiment, the body has a configuration of a rectangular prism. Those skilled in the art will appreciate that any attachment to a rotating head will preferably have a center of mass at its center 104.

Two opposing trimmer head clamps 106 extend upward from the elongate body 102 in an upward direction. In this embodiment, each of the trimmer head clamps 106 is connected to a head clamp carriage 108 by rigid posts 110. Optionally, the head clamps 106 may be vertically adjustable by adjusting their attachment to the rigid posts 110 or otherwise. Optionally, only a single post or three or more posts may be used to attach the clamp 106 to the carriage 108.

An adjustable circular tension strap 112 extends between the two opposing head clamps 106, and may be elastomeric and/or have an adjustable length. In this embodiment, the tension strap is releasably and adjustably connected to itself using velcro strips. Each of the head clamp carriages 108 is spring biased toward the center 104 of the attachment 100. In use, a typical weed eater head is positioned between the head clamps 106 which impinge upon and frictionally engage the sides of the weed eater head. Because weed eater heads typically utilize a high angular velocity, the circular tension strap 112 is used to tighten the grip of the head clamps 106 and provide additional frictional intention engagement with the weed eater head in order to transfer the head's angular velocity to the attachment 100.

In this embodiment, each of the opposing head clamps 106 includes two lateral rectangular arms 114 attached by lateral hinges 116. Lateral hinges 116 may optionally be biased. The two transverse rectangular arms 114 of each had to clamp 106 extend in opposing transverse directions from the head clamps 106. The adjustable circular tension strap is threaded through strap guides 118 on the head clamps 106 and strap guides 120 on the lateral arms 114. The head clamps 106 and the lateral arms 114 may also include one or more pads or strips 121 of highly frictional material such as rubber or other material known to create a grip. These pads or strips 120 also assist in forming a tight friction fit with a lawn trimmer head.

The head clamp carriages 108 are located within opposing longitudinal tracks 124. In this embodiment, each track 124 is defined by two lateral longitudinal sidewalls 126. A longitudinal central bolt 128 extends longitudinally through each longitudinal track 124 and through the carriages 108. In this embodiment, a single longitudinal bolt 128 extends through both opposing tracks 124. Each of the opposing tracks 124 includes a spring 132 anchored to an anchor 134 at the distal end of the bolt 128. Each spring 132 impinges upon one of the carriages 108, thereby providing a spring biased in the carriage 108 and a longitudinal direction and toward the center 104. In this embodiment, one of the anchors 134 comprises a nut 136 screwed onto the end of the longitudinal bolt 128. This allows the bias created by the springs 132 on each of the carriages 108 to be adjusted by rotating the nut 136. The nut 136 may be completely unscrewed from the bolt 128 in order to disassemble the entire attachment 100 for cleaning or other purposes. During normal use and when fully assembled, a track cover 138 is attached to the top of the elongate body 102 to substantially cover the longitudinal tracks 124, thereby preventing debris from clogging the tracks and/or interfering with the springs 132 or otherwise increasing wear on the device.

The bottom 140 of the elongate body 102 includes a plurality of longitudinally spaced blade sockets 142 extending distally in both directions from a central brush 144. In this embodiment, the blade sockets 142 are rectangular, and the central brush 144 extends further in the longitudinal direction than the transverse direction. The central brush 144 may optionally be interchangeable with brushes of different sizes, shapes, texture and/or strength. A pair of opposing transverse blades 146 are spaced equidistant only from the center 104 in opposing sockets 142. To preserve a center of gravity at the center 104, the transverse blades 146 are spaced equidistant me from the center 104. Each of the transverse blades 146 includes a blade base 148 which is inserted into the socket 142. A longitudinal bolt 150 extends through the sockets 142 and through the blade bases 148. To reposition the transverse blades 146, the longitudinal bolt 150 is removed, the transverse blades 146 are then relocated to a desired pair of Blade sockets 142, and the longitudinal bolt 150 is reinserted. In this embodiment, the longitudinal bolt 150 is secured in place by a cotter pin 151. Those skilled in the art will appreciate that there are other mechanisms for removably securing blades in various sockets of different distance from the center of the attachment.

In use, the trimmer attachment 100 is positioned so that the head clamps 106 rest against opposite sides of the head of a typical lawn trimmer. The tension strap 112 may be adjusted to tighten the attachments grip on the lawn trimmer head. The transverse blades 146 are positioned in the desired blade sockets 142 so that the distance between the opposing transverse blades 146 is slightly larger than the diameter of a sprinkler head. The opposing transverse blades 146 are then secured in the appropriate sockets 142 using a longitudinal bolt 150 or other mechanism. An operator then actuates the lawn trimmer and places it over a sprinkler head to be trimmed. The attachment 100 rotates with the trimmer head, causing the transverse blades 146 to trim vegetation growing over the sprinkler head. The central brush 144 brushes cut vegetation and any other debris from the top of the sprinkler head.

FIGS. 15-18 show an alternative embodiment of a lawn trimmer attachment 164 trimming a sprinkler head in accordance with principles of the invention. In this embodiment, there is a single cover 168 over the top of the elongate body 170. The head clamps 172 are attached directly to the carriages 174, and are not separated by posts. The head clamps 172 also do not include lateral arms or high friction strips or pads. The tension strap 176 is a worm gear hose clamp and is not elastic like the tension strap 112 in the previous embodiment. In addition, the bottom brush 180 is elongate in a transverse direction rather than a longitudinal direction like the central brush 144 in the previous embodiment. In addition, the blade sockets 182 are transverse channels in an open bottom 186 of the elongate body 170.

Figure 19:
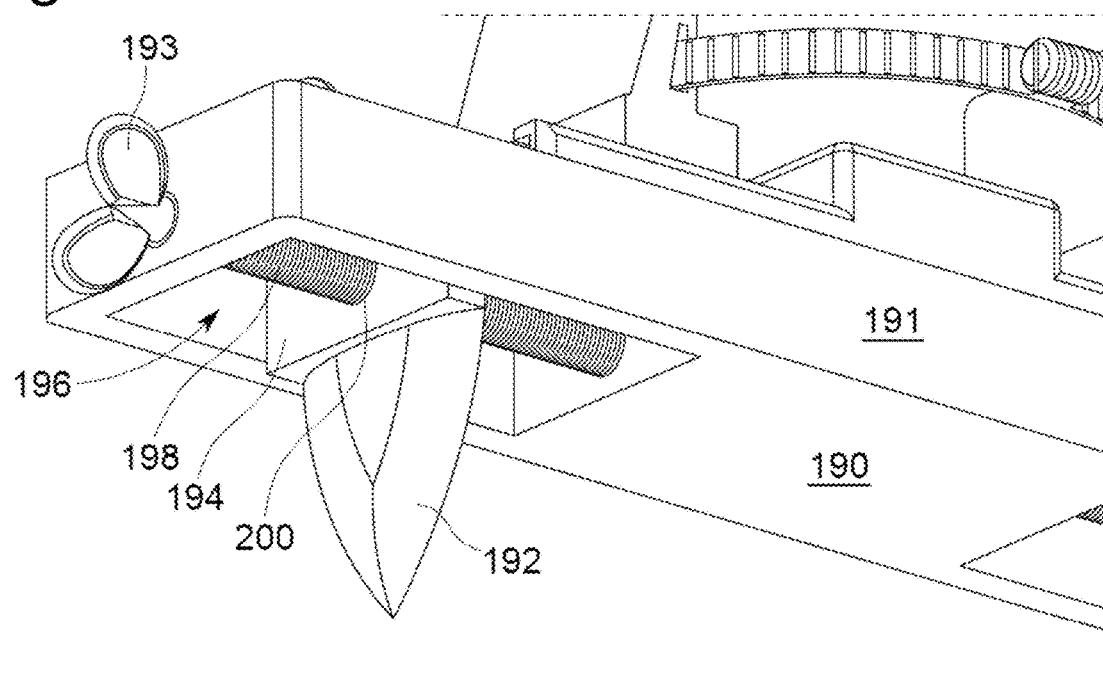
FIG. 19 is a perspective view of another alternative embodiment of a lawn trimmer attachment for trimming sprinkler heads in accordance with principles of the invention.

FIG. 19 shows an alternative embodiment of a bottom 190 an elongate body 191 in accordance with principles of the invention. In this embodiment, the transverse blade 192 has a rectangular base 194 sidably engaged within a blade channel 196. A threaded bolt 198 extends through the blade channel 196 and a threaded hole 200 in the base 194 of the transverse blade 192. The distal end 193 of the threaded bolt 198 extends out of the elongate body 191 and has a thumb-screw configuration. The position of the transverse blade is adjusted by turning the threaded bolt 198.

Figure 20:
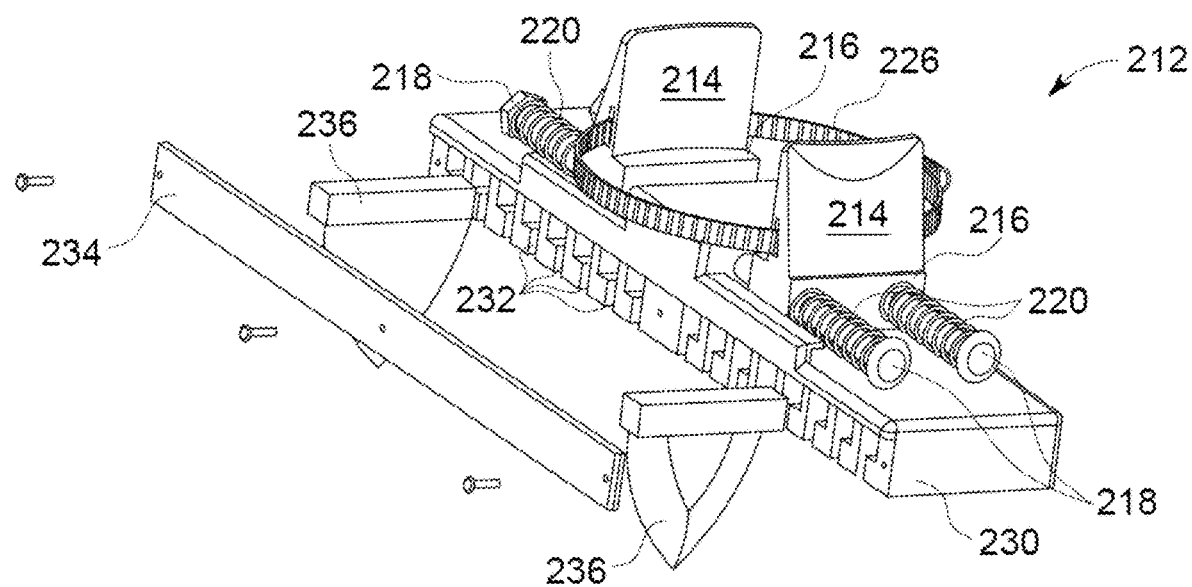
FIG. 20 is a partially exploded view of another alternative embodiment of a lawn trimmer attachment for trimming sprinkler heads in accordance with principles of the invention.

FIG. 20 shows another alternative embodiment of a lawn trimmer head attachment 212 four trimming a sprinkler in accordance with principles of the invention. In this embodiment, the head clamps 214 are directly attached to the clamp carriages 216. In this embodiment, two parallel longitudinal bolts 218 extend through each of the carriages 216, each of which have biasing springs 220 anchored at the distal ends of the longitudinal bolts 218 and bias the head clamps 214 toward the center of the attachment 212. The tension strap 226 of this embodiment is also a worm gear hose clamp. The bottom 230 of the attachment 212 has a plurality of longitudinally spaced transverse blade sockets 232 having a T shaped cross-section. A removable lateral sidewall 234 may be removed in order to remove the transverse blades 236 so they may be repositioned in different blade sockets 232. The lateral sidewall 234 is then replaced, securing the transverse blades 236 in place.

FIGS. 21-28 disclose an alternative embodiment of an adjustable lawn trimming attachment 250 for trimming around sprinkler heads comprising a body, an adapter extending upward from the body, two or more elongated arms extending outward and are substantially coplanar to the body, two or more blade sockets along a longitudinal direction on the bottom side of each of the two or more elongated arms, and a blade extending downward from the bottom of each of the two or more elongated arms. The adjustable lawn trimming attachment further comprises a spring biased interlock pin on the distal end of each of the two or more arms, where the spring biased interlock pin extends through the blade base to lock the blade into one of the two or more blade sockets on each of the two or more elongated arms.

Figure 21:
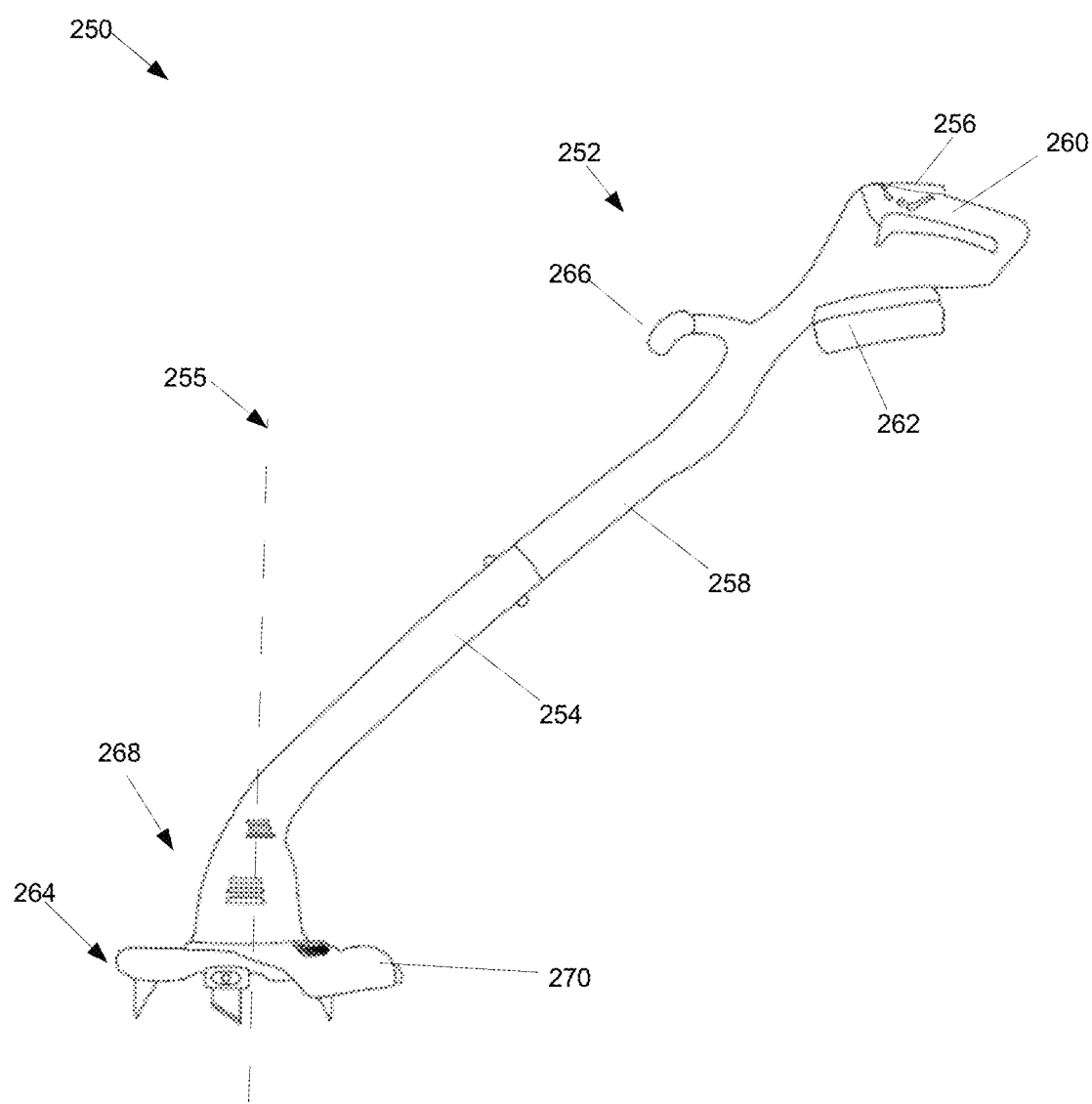
FIG. 21 is a side elevation view of an adjustable lawn edger attachment for trimming around sprinkler heads attached to a lawn edger in accordance with the principles of the invention.
Figure 22:
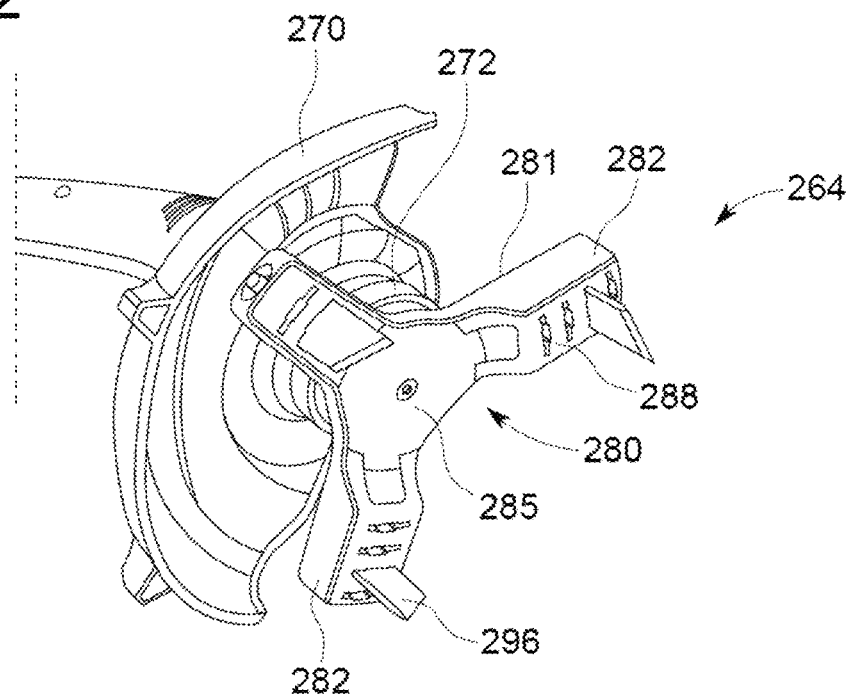
FIG. 22 is a bottom perspective view of the adjustable lawn edger attachment in accordance with the principles of the invention.
Figure 23:
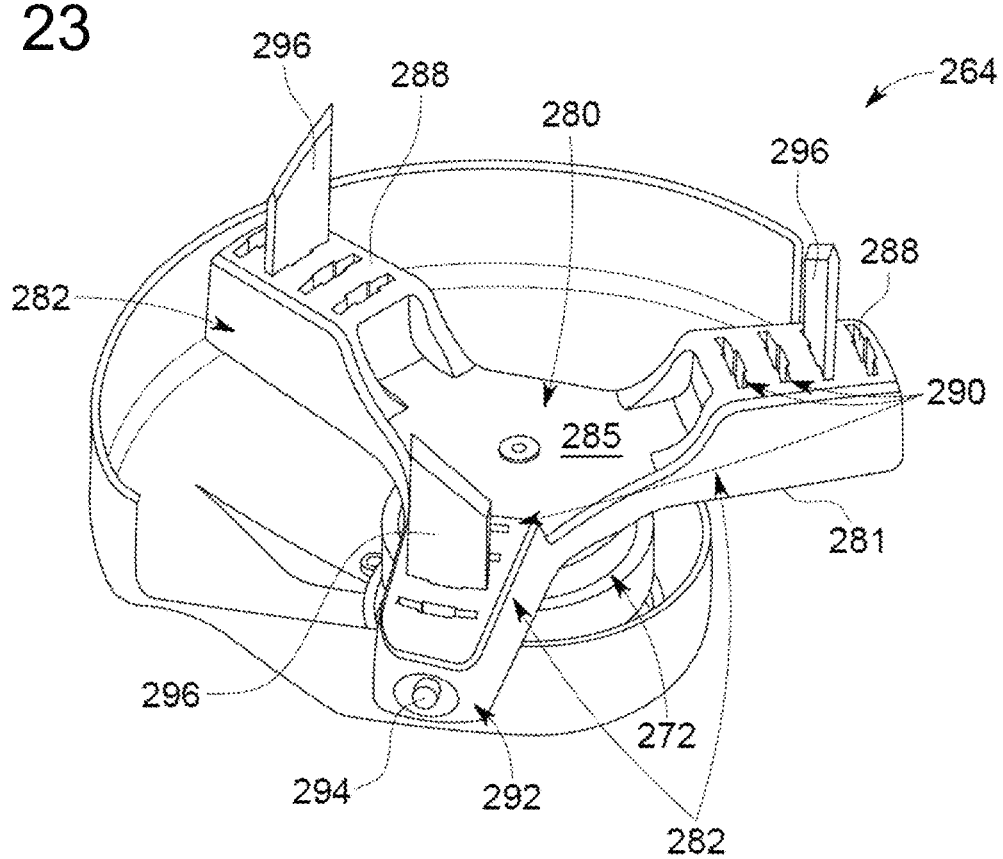
FIG. 23 is a bottom perspective view of the adjustable lawn edger attachment in accordance with the principles of the invention.

FIG. 21 displays a side elevation view of lawn edger with an adjustable lawn edging attachment 250 for trimming around sprinkler heads in accordance with the principles of the invention. The lawn edger 250 includes an elongate pole 254 housing an internal electric motor, not shown. In this embodiment, the lawn edger 250 is forty-five inches long and is made of hard resin plastic. However, the lawn edger 250 may be any length and may be made of any suitable material. The proximal end 252 of the pole 254 has a handle 258 including a grip 260, a trigger 256 to power the lawn edger 250, and a removable, rechargeable battery 262. In this embodiment, the battery is an 18-volt battery. However, any compatible lawn edger battery 262 may be used. The handle 258 also includes an ancillary handle 266 so that the lawn edger 250 may be held by both hands of the user to allow the user to better control the direction of the lawn edger 250. The lawn edger 250 further includes a removeable lawn edging attachment 264 for trimming around sprinkler heads at its distal end 268, and a safety shield 270 extends partially around the attachment 264 to protect the user from flying debris. The removeable lawn edging attachment 264 is attached to the lawn trimmer by an adapter 272 and rotates about an axis 255. The adapter 272 imparts rotational motion to the removable lawn edging attachment 270, or any other attachable edging head, attached to it. The adapter 272 is universal in size to fit onto most lawn edgers 250. The lawn edging attachment 264 is shown in more detail in FIGS. 22-28.

FIGS. 22-26 display perspective views of a lawn edging attachment 264 for trimming around sprinkler heads 14. The lawn edging attachment is formed by a central body 280 and two or more elongate radial arms 282 extending outward from the central body 280. In this embodiment, the central body 280 is triangular and has three radial arms 282 spaced equidistantly from each other around the body 280. The elongate radial arms 282 and the central body 280 share a flat, planar upper side 281 transverse to the axis of rotation 255. The central body 280 has a planar bottom 285. The arms 282 have substantially coplanar bottoms 288 below the bottom 285 of the central body 280. As explained in more detail below, each of the arms 282 house blade locking mechanisms, and therefore have a distance between their bottoms 288 and the planar upper side 281 greater than the distance between bottom 285 of the body 280 and the upper side 281. In this embodiment, there are three elongated arms 282 spaced radially equidistant about the central axis 255, which extends through the body 50. However, those having ordinary skill in the art would appreciate that the lawn edging attachment 264 may include only two elongate radial arms or more than three elongate radial arms, so long as they are equally distanced so that the attachment is properly balanced.

The coplanar bottom sides 288 of each of the elongate radial arms 282 include two or more longitudinally spaced blade sockets 290 extending distally from the body 50. In this embodiment, the blade sockets 290 are substantially rectangular, but also slightly curved along a radial direction, i.e. around the central axis 255, which is transverse to the longitudinal direction, which stretches along each of the radial arms from the central body 280 to the distal ends 292 of the arms. In this embodiment, each elongate radial arm 282 has four blade sockets 290 that are longitudinally equidistantly spaced along the arms 282. In this embodiment, the four blade sockets 290 form cut diameters of five, six, seven, and eight inches, respectively. Those having ordinary skill in the art would appreciate that any number of blade sockets at any given distances from the central axis 255 of the body 280 may be suitable. Each of the two or more elongated arm 282 contains a spring biased interlock button 294 on its distal end 292 for removably attaching the blades 296 as explained in more detail below.

Figure 24:
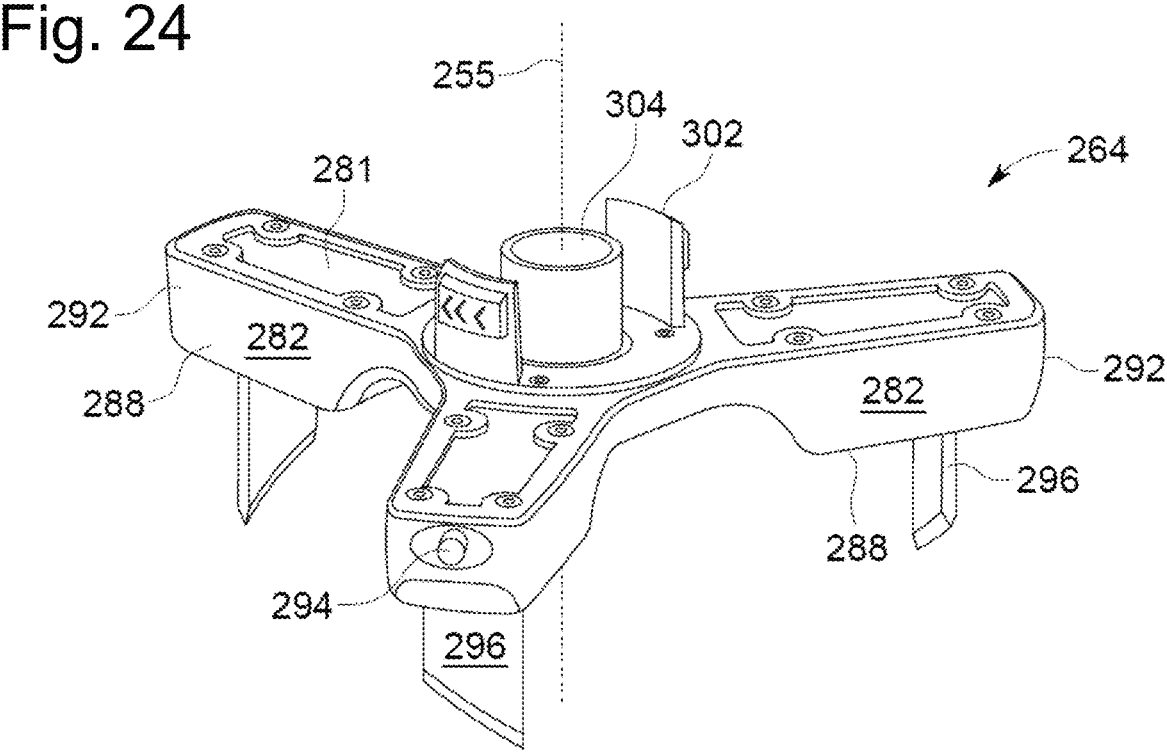
FIG. 24 is a top perspective view of the adjustable lawn edger attachment in accordance with the principles of the invention.
Figure 25:
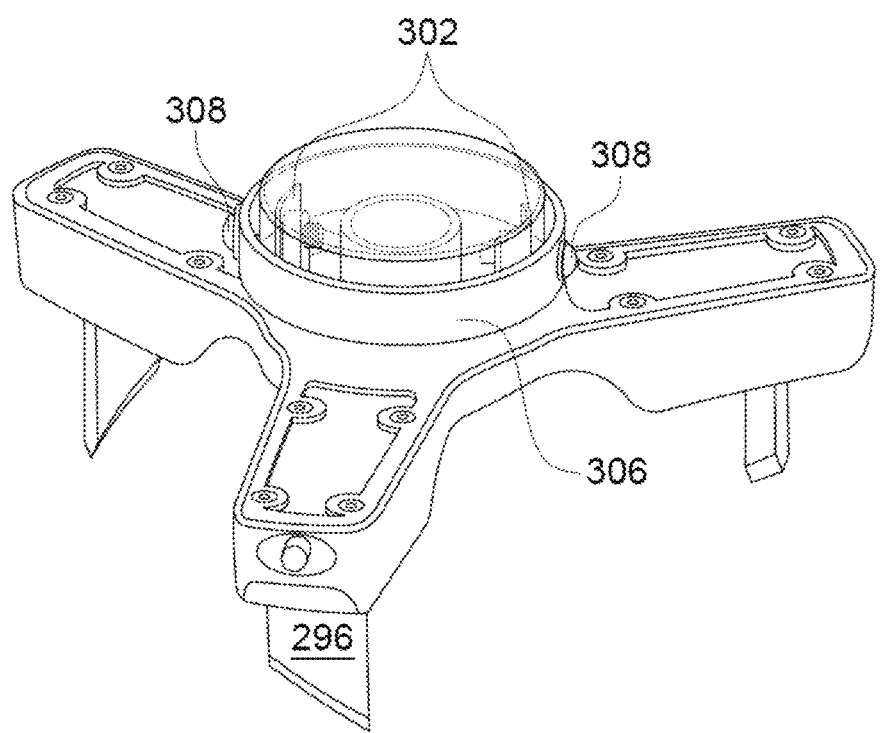
FIG. 25 is another top perspective view of the adjustable lawn edger attachment in accordance with the principles of the invention.

Referring to FIGS. 24 and 25, the body 280 includes an adapter 272 on its planar upper top side 281. The adapter 272 is formed by a disk 300 from which extend upward two opposing, curved trimmer head clamp plates 302 and a centered cylindrical cuff 304, each centered around the axis 255. A clamp ring 306, shown in FIG. 25, is positioned around the outside the two clamp plates 302. Two screws 308, extending through the clamp ring to impinge against the clamp plates 302. These screws 308 may align with and connect to a coupling mechanism such as a cuff. Optionally, the screws 308 may create a friction fit between them and the plates 302, to removably affix the attachment 264 to a coupling cuff. In this embodiment, the safety screws 48 are stainless steel. However, any machine screw, pin, or fastener would be acceptable. Furthermore, those having ordinary skill in the art will appreciate that any method of securely fastening the lawn edging attachment 264 to a lawn edger may be suitable. In this embodiment, the lawn edging attachment 264 and its blades 296 and other components are made of a hard resin and/or plastic, such as, for example, high density polyethylene, high density polypropylene, polystyrene resin, polyurethane resin, epoxy resin, silicone resin, acrylic resin and/or polyester resin and the like. However, any kind of durable material can be used.

Figure 26:
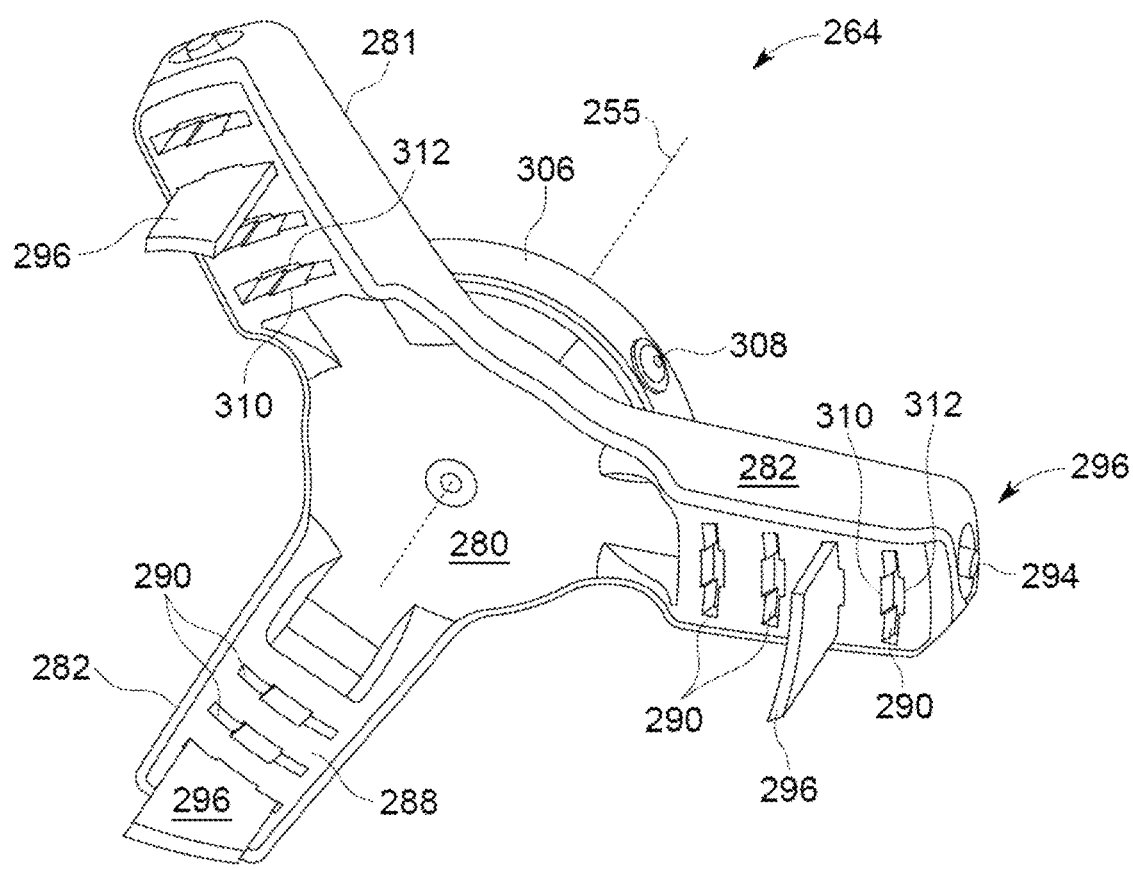
FIG. 26 is another bottom perspective view of the adjustable lawn edger attachment in accordance with the principles of the invention.

FIG. 26 shows the bottom of the attachment 264 and the blade sockets 290 in more detail. The blade sockets 290 of this embodiment are curved about the central axis 255. This prevents the blades 296 from being inserted in the wrong direction into the sockets 290. This is particularly beneficial when the blades 296 have an angled bottom cutting region, as explained below. The sockets 290 of this embodiment also include a proximal groove 310 and a distal groove 312 that align with ridges or splines on the blades 296. This also ensures that the blades are secured in the sockets in the correct direction, and are appropriately aligned. Those skilled in the art will appreciate that both the raised ridges and the curvature of the blades 296 serve to strengthen the blades and increase their durability.

Figure 27:
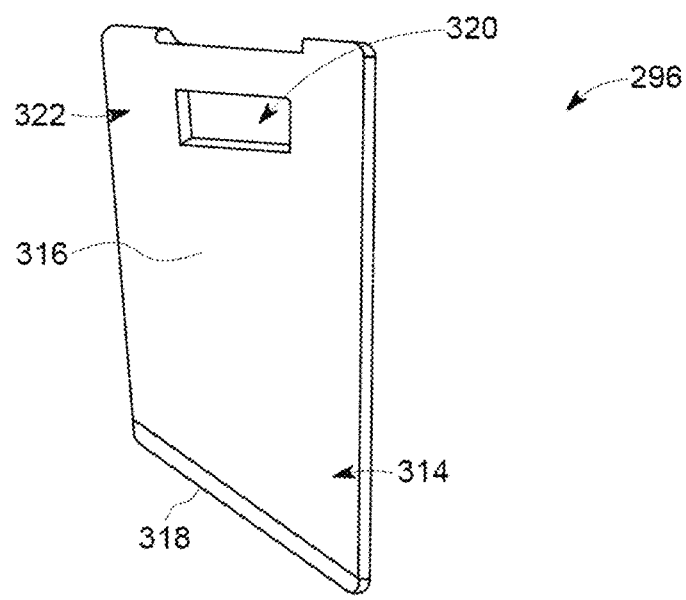
FIG. 27 is a front elevation view of a blade for an adjustable lawn edger attachment in accordance with the principles of the invention.
Figure 28:
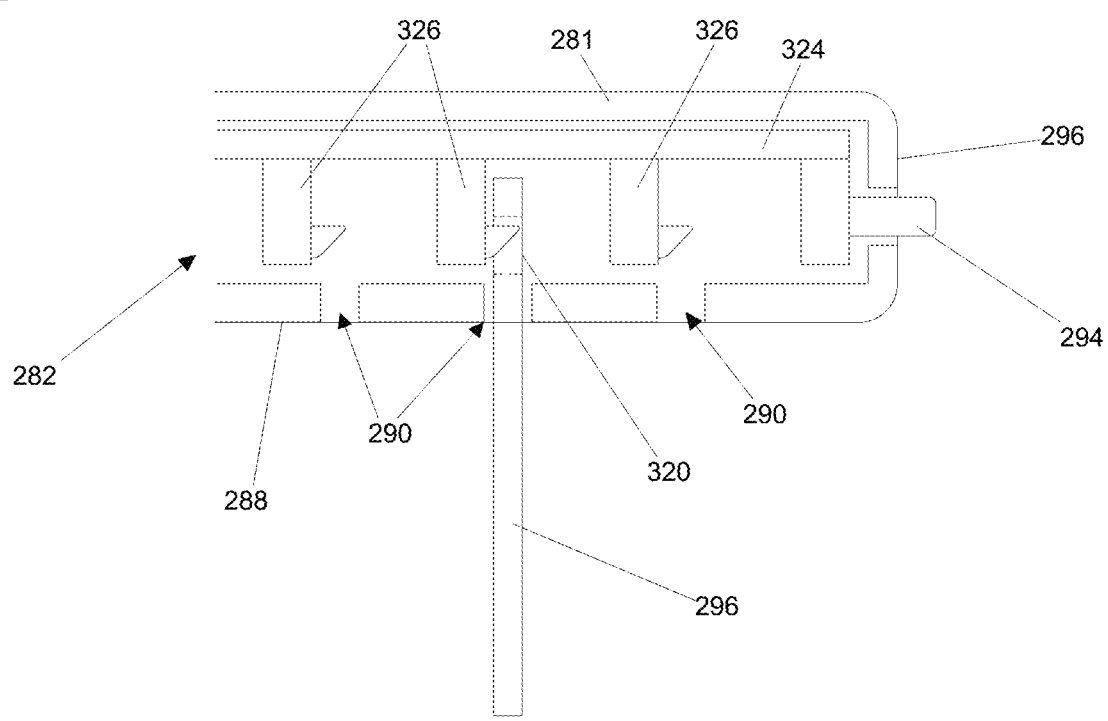
FIG. 28 is a cut-away view of an elongate radial arm of adjustable lawn edger attachment in accordance with the principles of the invention.

FIG. 27 shows a blade 296. In this embodiment, the bottom cutting edge 318 of the cutting region 314 is slanted to improve cutting of grass and other vegetation. A ridge 316 runs down the blade 296 and aligns with one of the grooves in the socket to properly align the blade 296 and prevent it from wobbling within the socket 290. A hole 320 in the upper region 322 allows the blade 296 to be removably locked into a socket 290. FIG. 28 shows the locking mechanism housed within each elongate radial arm 282. The button 294 is biased in the distal direction and is attached to an actuator 324 which is itself attached to a plurality of locking tabs 326, one for each socket 290. When the button 294 is depressed, the blade 296 is released and may be removed. To insert a blade 296, it is simply pushed into the socket 290 until the corresponding locking tab 326 snaps into the hole 320 of the blade 296. In this embodiment, the tabs 326 have an angled lower surface which allows a blade to be inserted and locked into a socket without requiring the release button 294 to also be depressed. Optionally, the tabs may have a more rectangular shape so that the release button 258 must also be depressed before the blade may be fully inserted into a socket. The curvature of the blade and socket insures that the blade is correctly aligned. The blades 296 may be placed in blade sockets 290 which are the same distance from the axis 255. Those skilled in the art will appreciate that there are other mechanisms for removably securing blades in various sockets of different distance from the center of the attachment. In use, the lawn edger 250 is placed over a sprinkler head or other object. The lawn edging attachment 264 rapidly and efficiently cuts a circular hole in vegetation surrounding the lawn sprinkler head. The lawn edging attachment 264 may be used to cut a circular opening in vegetation about any other desired object as well.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. An adjustable lawn edging attachment for trimming around sprinkler heads comprising:
   a central body;
   an adapter extending upward from a top side of the body; wherein the adapter is configured to attach to a lawn edger;
   two or more elongate radial arms extending outward from the central body and spaced equidistantly about a central axis of rotation;
   a plurality of longitudinally spaced blade sockets extending distally along bottom sides of each of the elongate radial arms;
   a blade removably secured in one of the plurality of blade sockets of each of the elongate radial arms;
   an internal locking mechanism housed within each of the elongate radial arms that locks the blade when fully inserted into one of the plurality of blade sockets of each of the elongate radial arms; and
   a release button at a distal end of the each of the elongate radial arms which releases the blade in one of the plurality of blade sockets when depressed;
   wherein the internal locking mechanism of each elongate radial arm includes spring biased locking tabs in each of the blade sockets which is inserted into a hole in an upper region of the blade when the blade is inserted into one of the sockets.

2. The adjustable lawn edging attachment for trimming around sprinkler head of claim 1 wherein each of the blade sockets of the plurality of blade sockets of each of the elongate arms is rectangular and curved along a radial direction, and each of the blades removably secured in one of the plurality of blade sockets has a rectangular, curved cross-section complementary to the blade sockets.

3. The adjustable lawn edging attachment for trimming around sprinkler head of claim 2 wherein each blade socket includes a proximal alignment groove and a distal alignment groove and each blade has a proximal ridge complementary to the proximal alignment groove of the blade sockets and a distal ridge complementary to the distal alignment groove of the blade sockets.

4. The adjustable lawn edging attachment for trimming around sprinkler head of claim 1 wherein the bottom cutting region of the blade is angled.

5. The adjustable lawn edging attachment for trimming around sprinkler head of claim 4 wherein the two or more elongate arms comprises three elongate arms.

6. The adjustable lawn edging attachment for trimming around sprinkler head of claim 5 wherein the central body and arms have flat coplanar top sides extending transverse to the axis of rotation.

7. The adjustable lawn edging attachment for trimming around sprinkler head of claim 6 wherein the elongate radial arms have flat, coplanar bottoms extending transverse to the axis of rotation.

* * * * *